Figures 1, 2, 3:
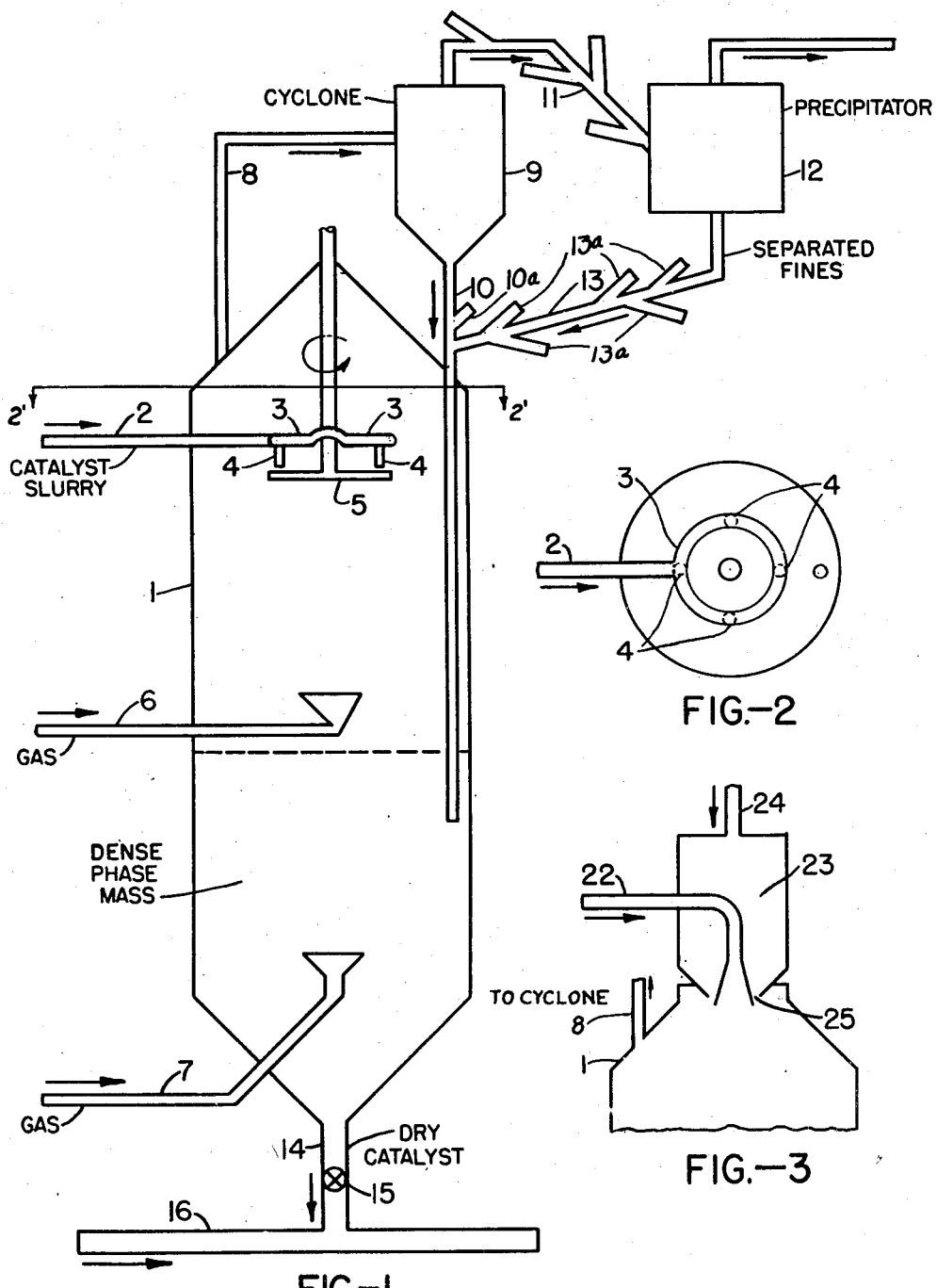

July 12, 1949. J. J. OWEN 2,475,984
PROCESS FOR DRYING HYDROGEL CATALYSTS
Filed March 11, 1944

John J. Owen INVENTOR
BY _____ ATTORNEY

Patented July 12, 1949

2,475,984

UNITED STATES PATENT OFFICE 2,475,984

PROCESS FOR DRYING HYDROGEL CATALYSTS

John J. Owen, Baton Rouge, La., assignor to Standard Oil Development Company, a corporation of Delaware Application March 11, 1944, Serial No. 525,995

2 Claims. (Cl. 34—10)

This invention relates to a process for the drying of hydrous oxides in suspension and more particularly it relates to the drying of hydrogels having a spherical form.

Inorganic gels are well known and have been long used for various purposes, for example for the adsorption of condensible vapors from gaseous carriers and for catalytic purposes as a catalyst itself or as a component thereof or as a carrier. The most widely used of these inorganic gels in the dried condition is that of silica with or without the use of other gelatinous materials such as alumina. However, other gels are known such as alumina, titania, zirconia and the like.

These gels have been found to be particularly useful as catalysts for carrying out reactions involving hydrocarbons. For example, cracking, dehydrogenation, hydrogenation and the like. These catalysts are particularly adapted for use in the so-called fluid catalyst process in which the catalyst is in a powdered form and is aerated or fluidized by means of a gas so that it acquires the properties of a liquid such as fluid flow, hydrostatic pressure and the like. These powdered catalysts are generally prepared by grinding silica gel or other types of gel catalysts to the desired size. Recently it has been found that catalysts having a particle size within the desired range for the fluid catalyst process, that is between 20 and 120 microns, can be prepared by causing a sol of the desired gel-forming substance to set while dispersed in a water-immiscible liquid, such as oil, whereby spherical particles having diameters up to 1 mm. are obtained, the actual diameters depending upon the degree of dispersion which is a function of the viscosity of the oil, the degree of agitation, the ratio of sol to oil, etc. The spherical particles thus obtained are washed and dried usually in air and then heated to a temperature of about 850 to 1200° F. for activation. However, when these spheres are dried in this manner it is found that they tend to agglomerate so that the advantage of the spherical form is lost.

It is therefore one object of this invention to provide a more efficient method for drying hydrogel spheres.

It is another object of this invention to dry hydrogel spheres in such a manner as to prevent the agglomeration of the individual spheres.

Other objects of this invention will be apparent from the following description and drawing, in which Figure 1 is a sectional elevation of the preferred form of apparatus used in this invention. Figure 2 is a cross section of the distributor of Figure 1 taken along lines of 2'—2' of Fig. 1. Figure 3 is another form of the spraying device used in Fig. 1.

These and other objects of this invention are attained by dispersing the hydrogel spheres into a stream of a hot inert gas whereby water is quickly removed from the hydrogels without causing agglomeration of the individual spheres.

The invention will be described in detail with reference to the drying of small spherical particles of hydrogel but this description is to be considered illustrative only and in no way any limitation of this invention.

Referring to Figure 1, I represents a vessel into which a slurry of hydrogel spheres in water, oil, butanol or other liquid which may be used to displace the water from the hydrogel pores is introduced through line 2 and distributor 3. As shown in Figs. 1 and 2, distributor 3 is provided with depending legs 4 through which the slurry is allowed to drop on to a revolving disc 5. The action of the revolving disc causes the slurry of spheres to be sprayed or dispersed throughout the upper portion of the vessel, against a current of hot inert gas introduced through line 6. This results in the particles being subjected to a whirling action which facilitates the removal of the water. The temperature of this gas may be widely varied but preferably should be between 150 and 800° F. The gas should be introduced at such a rate that the spherical particles will not be carried out of vessel I by the gas stream but instead will tend to settle slowly to the bottom of said vessel and form a dense fluidized mass of dry spherical particles having a level, similar to that of a boiling liquid.

The density of the mass below the level is preferably held between 10 and 30 lbs. per cu. ft. The space above the level has a much lower density. The particles in the space above the level are maintained in a turbulent condition by the gas introduced through line 6. It is also desirable to maintain the dense phase mass in a turbulent condition. This is accomplished by the simultaneous introduction of a heated inert gas through line 7. Due to the turbulent condition thus obtained the temperature throughout both the dense phase mass and that above it is easily controlled, thus facilitating the drying action. Inert gas is withdrawn from vessel I through line 8 and introduced into cyclone separator 9 to remove any entrained spherical particles which escaped settling to the lower portion of vessel I. Solids separated in cyclone 9 are removed through line 10 which dips into the vessel 1 and terminates below the level of the fluidized mass, thus returning the fines to the drying zone. Gases from the cyclone 9 are removed through line 11 and introduced into electric precipitator 12 for the separation of the more finely divided particles from the gas. These fines leave the precipitator through line 13 and are combined with the particles removed from the cyclone in line 10. If desired, the flow of the particles in lines 10, 11, and 13 may be facilitated by introducing as aerating gas at intervals along the length thereof, for example by means of lines 10a, 11a and 13a.

Dried catalyst particles are removed from vessel 1 through line 14 controlled by valve 15 and are introduced into the circulating system of a fluid catalyst unit by means of a gas flowing in line 16. This is preferably accomplished by having the dense phase mass in the bottom of vessel 1 and line 14 of such a height that the introduction of the mass into the gas flowing through line 16 produces a less dense mass than that in line 14 and vessel 1 so that the pressure exerted at the point of entry of the dense phase mass from line 14 into line 16 is sufficient to move the catalyst into line 16 and prevent bypassing of the gas through line 14 and vessel 1.

Referring now to Figure 3 there is shown an alternative method for spraying the catalyst into the vessel 1. In this embodiment a catalyst slurry is introduced through line 22 placed within sleeve 23 into which hot inert gas is introduced through line 24. The hot gas issuing from sleeve 23 through nozzle 25 picks up the catalyst slurry issuing from line 22 and sprays it into vessel 1 against hot inert gas introduced through line 6. Inert gas is withdrawn through line 8 and introduced through a cyclone separator as disclosed in connection with Figure 1.

From the above description it is evident that small spherical particles of hydrogel may be sufficiently dried by dispersing them into the hot inert gas issuing from line 6 before contacting the walls of vessel 1 so that the shape of the particles are not altered and the tendency to agglomerate is overcome.

The catalyst should be introduced into vessel 1 in as concentrated form as possible so the amount of water to be evaporated will be a minimum. However, enough water should be present in the slurry so that it will flow easily. In some cases it may not be convenient to completely dry the catalyst particles in one operation. However, the apparatus described will carry the drying to such a point that there will be no tendency for the particles to agglomerate. When this stage is reached the particles may be completely dried in any other manner desired without fear of agglomeration.

It is to be understood that the precise details enumerated in the above description are not fixed and numerous modifications thereof may be made by those skilled in the art without departing from the spirit of the invention.

The nature and objects of this invention having thus been set forth and an illustrative embodiment thereof given what is claimed as new and useful and desired to be secured by Letters Patent is:

1. Process for preparing dry adsorbent inorganic gels in spherical form from hydrogel spheres which comprises introducing hydrogel spheres into the upper portion of a drying zone against a rising stream of hot inert gas, regulating the velocity of said rising stream of gas to permit said spheres to settle slowly to the lower portion of said drying zone as a dense phase fluidized mass having a level, introducing said hot inert gas at points above and below the level of the dense phase, removing dry gel spheres from the bottom of said drying zone and removing inert gas from the top of said zone.

2. Process according to claim 1 in which the hydrogel spheres are introduced into the drying zone in the form of an aqueous slurry.

JOHN J. OWEN.

REFERENCES CITED

The following references are of record in the file of this patent:

UNITED STATES PATENTS

| Number | Name | Date |
| --- | --- | --- |
| 1,501,876 | Wreesmann | July 15, 1924 |
| 1,561,971 | Coffin | Nov. 17, 1925 |
| 1,984,380 | Odell | Dec. 18, 1934 |
| 1,989,406 | Doolittle | Jan. 29, 1935 |
| 2,101,635 | Bender | Dec. 7, 1937 |
| 2,259,487 | Payne | Oct. 21, 1941 |
| 2,284,248 | Baker et al. | May 26, 1942 |
| 2,335,732 | Bowen | Nov. 30, 1943 |
| 2,345,600 | Heard | Apr. 4, 1944 |